(12) United States Patent
Benard et al.

(10) Patent No.: US 7,590,138 B2
(45) Date of Patent: Sep. 15, 2009

(54) SYSTEM FOR DEFINING AN ALTERNATE CHANNEL ROUTING MECHANISM IN A MESSAGING MIDDLEWARE ENVIRONMENT

(75) Inventors: Patrick Benard, Cagnes sur Mer (FR); Philippe Favre, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 10/557,917

(22) PCT Filed: Mar. 25, 2004

(86) PCT No.: PCT/EP2004/004263

§ 371 (c)(1),
(2), (4) Date: Nov. 21, 2005

(87) PCT Pub. No.: WO2004/107673

PCT Pub. Date: Dec. 9, 2004

(65) Prior Publication Data

US 2007/0078995 A1 Apr. 5, 2007

(30) Foreign Application Priority Data

May 27, 2003 (EP) .................................. 03368047

(51) Int. Cl.
*H04J 3/16* (2006.01)
(52) U.S. Cl. ........................ 370/437; 370/433
(58) Field of Classification Search ................. 370/507, 370/509, 510, 431, 433, 437
See application file for complete search history.

(56) References Cited

U.S. PATENT DOCUMENTS

| 4,884,263 | A | * | 11/1989 | Suzuki | 370/225 |
| 4,956,835 | A | * | 9/1990 | Grover | 370/228 |
| 5,502,719 | A | * | 3/1996 | Grant et al. | 370/412 |
| 5,781,549 | A | * | 7/1998 | Dai | 370/398 |

(Continued)

OTHER PUBLICATIONS

D. Wackerow: "MQseries Primer" 'Online!; Oct. 1999, International Business Machines Co.—Redbooks, USA (34 pgs.).

(Continued)

*Primary Examiner*—Kwang B Yao
*Assistant Examiner*—Andrew Lai
(74) *Attorney, Agent, or Firm*—Schmeiser, Olsen & Watts; William H. Steinberg

(57) ABSTRACT

A method and system for routing channels in which messages are transmitted from a source application to a destination application. The system includes a finite-state machine, source message queues, and a source queue manager for managing the source message queues. The source message queues include a transmission queue for holding a first message for subsequent transmission of the first message from the transmission queue over a first channel to a local queue of the destination application. The method includes: activating the finite-state machine; and performing or not performing a channel routing action, by the finite-state machine, depending on: a channel event having caused the first channel to be started or stopped, a channel sender set for the first channel, and an event type characterizing the channel event as normal or abnormal. The channel routing action is a function of the channel event, the channel sender, and the event type.

4 Claims, 4 Drawing Sheets

U.S. PATENT DOCUMENTS

| | | | |
|---|---|---|---|
| 5,822,420 A * | 10/1998 | Bolon et al. | 379/230 |
| 6,144,638 A * | 11/2000 | Obenhuber et al. | 370/231 |
| 6,415,312 B1 * | 7/2002 | Boivie | 709/200 |
| 6,477,176 B1 * | 11/2002 | Hamalainen et al. | 370/435 |
| 6,782,964 B1 * | 8/2004 | Korthals et al. | 180/273 |
| 2002/0152320 A1 * | 10/2002 | Lau | 709/238 |
| 2003/0112748 A1 * | 6/2003 | Puppa et al. | 370/217 |
| 2004/0120173 A1 * | 6/2004 | Regev et al. | 365/49 |

OTHER PUBLICATIONS

"Dynamic Determination of Network Topology", IBM Technical Disclosure Bulletin, IBM Corp., New York (9 pgs.).

* cited by examiner

SYSTEM FOR DEFINING AN ALTERNATE CHANNEL ROUTING MECHANISM IN A MESSAGING MIDDLEWARE ENVIRONMENT

TECHNICAL FIELD

The present invention relates to the messaging middleware environment wherein messages are transmitted through a transmission network from a source application by means of message queues and relates in particular to a system for defining an alternate channel routing mechanism in such an environment.

BACKGROUND

In a messaging middleware environment such as the MQ series of IBM, applications communicate by means of queues through a transmission network such as a Local Area Network (LAN), a Wide Area Network (WAN) or a Public Switched Telephone Network (PSTN). On the source side, an application program opens a queue and puts messages into it. A mover or Message Channel Agent (MCA) is the program in charge of moving the messages to a target queue located on the destination side.

When a source application program wants to send a message to a destination application program, it has to communicate with a source queue manager by a Message Queue Interface (MQI) in order to put the message in a transmission queue. Before placing the message in the queue, the queue manager adds a header which contains information from the remote queue definition such as the name of the destination queue manager and the name of the destination queue.

The transmission of the messages is performed via communication channels. These channels can be started manually or automatically. To start a channel automatically, the transmission queue must be associated with a channel initiation queue into which an initiation message is put when the message to be transmitted is put into the transmission queue. A channel initiator which is an MQ series program is used to monitor the initiation queue. When the channel initiator detects a message in the initiation queue, it starts a Message Channel Agent (MCA) for the particular channel being used and the latter program moves the message over the network to the destination side of the channel.

On the receiving side, a listener program must have been started. This program monitors a specific port, by default, the port dedicated to MQ series. When the message arrives, the listener starts the MCA associated with the channels which moves the message into a specified local queue. The program that processes the incoming message can be started manually or automatically. To start the program automatically, the MCA puts the incoming message into the local queue and a trigger message into an initiation queue which is monitored by a trigger monitor. The latter program invokes the application specified in the process definition which issues a command to get the message from the local queue.

In the above system, there may be a communication problem due to a connectivity failure. In such a case, the channel to be used to move the message cannot be initiated and messages are kept in the transmission queue. This may cause an important problem when critical messages whose delivery is guaranteed by the messaging middleware (e.g. database updates, orders, inventories . . . ) are no longer propagated. The only solution to such a problem is to stop the queue manager (thus impacting delivery of the whole business activities) and to manually define an alternate communication path. This is a long, critical and cumbersome process which requires a thorough monitoring of all queue manager intercommunications. Furthermore, this solution results in an important cost since a highly skilled staff must be available and ready to take actions at any time.

SUMMARY OF THE INVENTION

Accordingly, the object of the invention is to provide a system adapted to automatically select an alternate channel to transmit messages between two applications in a messaging middleware environment as soon as the primary channel to be used has failed.

The invention relates therefore to a routing system for defining an alternate channel routing mechanism in a messaging middleware system wherein messages are transmitted through a transmission network from a source application to a destination application by means of message queues, such a messaging middleware system including a source queue manager for managing the sending of the messages, a transmission queue into which the messages to be transmitted are put by the source application, a primary channel for transmitting messages over the transmission network, a reception queue for receiving the messages and from which they are got by the destination application, a destination queue manager for managing the reception of the messages and an event queue into which the events relating to the primary channel are put. The system comprises a finite-state machine for receiving the channel events as activating inputs and providing actions to be taken for each channel event, one of the actions being to route messages on an alternate channel when the primary channel has failed.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
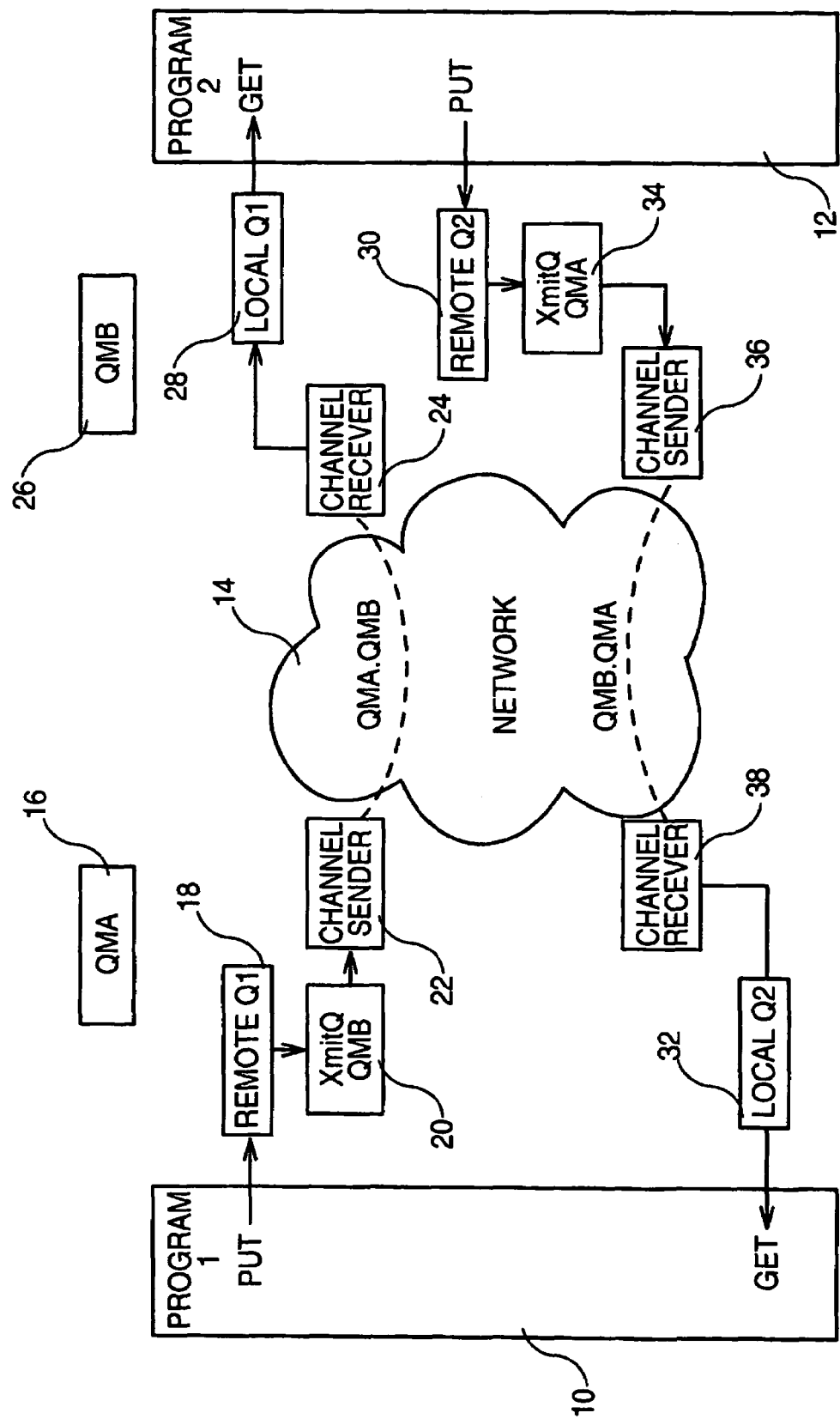
FIG. 1 is a block-diagram representing a messaging middleware system wherein a source application program associated with a source queue manager sends messages to a destination application program associated with a destination queue manager.

In reference to FIG. 1, it is assumed that a source application program 10 wants to communicate messages to a destination application program 12 through a network 14 which can be either a persistent network such as a Local Area Network (LAN), a Wide Area Network (WAN) or a transient network such as a Public Switched Telephone Network (PSTN), or an Integrated Services Digital Network (ISDN).

On the source side, each message is put (PUT instruction) by the application program and under the control of a source queue manager QMA 16 into a remote queue Q1 18 before the message is transferred into a transmission queue QMB 20. The message or the messages of queue 20 are then transmitted from a channel sender (QMA.QMB) 22 to channel receiver (QMA.QMB) 24 on the destination side. Note that, in the following, a channel will designate a logical connection between a channel sender on the source side and a channel receiver on the destination side.

On the destination side, the messages being received by the channel receiver (QMA.QMB) are queued under the control of a destination queue manager QMB 26 into a local queue Q1 28. It must be noted that the remote queue 18 of the source side is not a real queue but it is the definition of the local queue 28 in the destination machine. The messages placed in local queue 28 are then got (GET instruction) by the destination application program under the control of the queue manager QMB 26.

The process is the same for the other direction. The messages are put by the destination application program 12 in a remote queue Q2 30 which is the definition of a local queue Q2 32 on the source side. The messages transferred in a transmission queue QMA 34 are transmitted through the network 14 from a channel sender (QMB.QMA) 36 to a channel receiver (QMB.QMA) 38.

Figure 2:
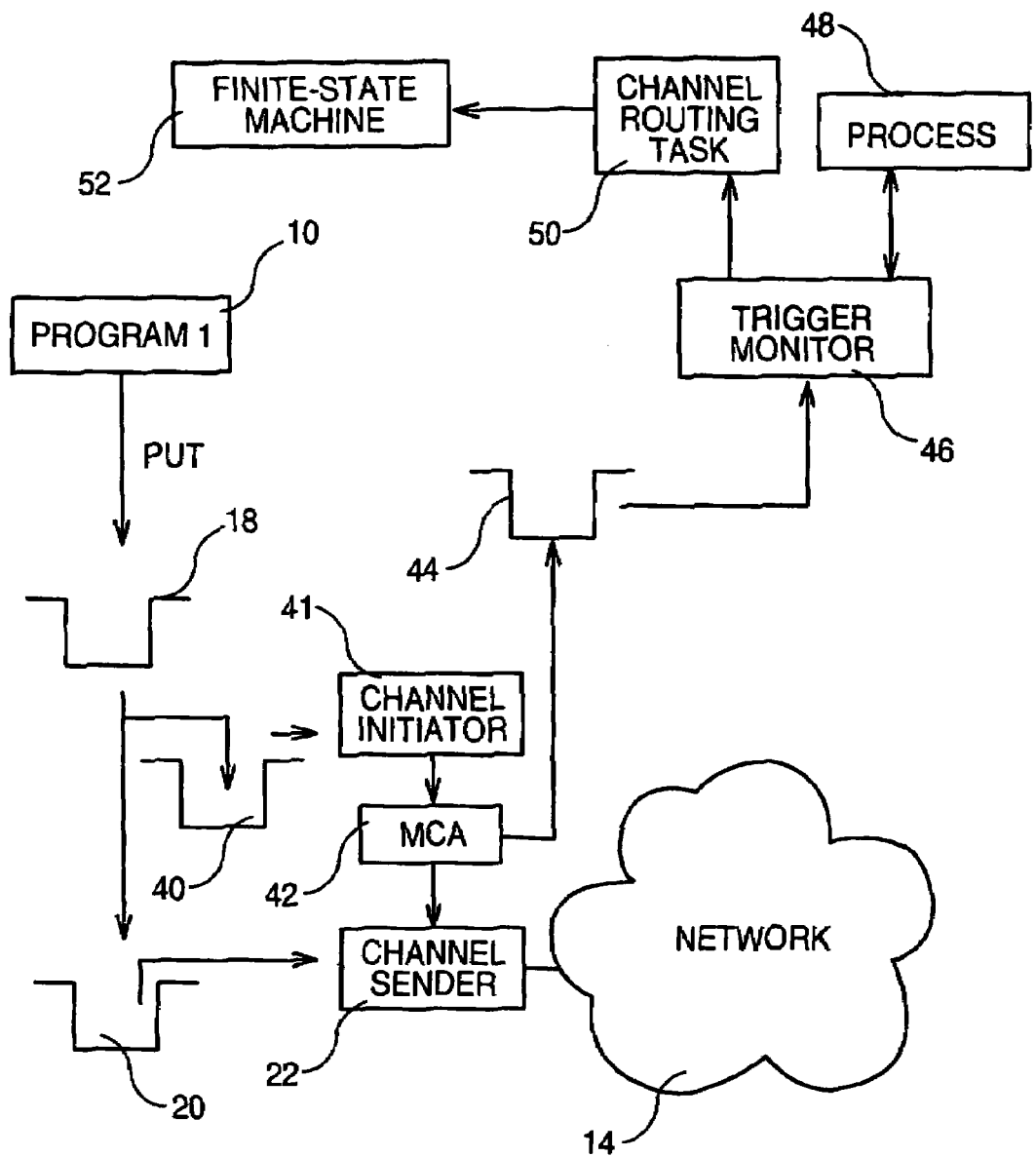
FIG. 2 is a schematic representation of a source queue manager including the features according to the invention.

The mechanism according to the invention is schematically illustrated in FIG. 2. As already mentioned, the source application program puts a message or several messages into a remote queue 18. The messages are transferred into a transmission queue 20 under the control of the source queue manager. When one or several messages are been put into transmission queue 20, an initiating message is put by the remote queue 18 into an initiation queue 40. A channel initiator 41 continually monitors initiation queue 40 in order to start the message channel agent (MCA) 42 in charge of triggering the transmission messages from the channel sender 22 through network 14. Note that the queue manager can trigger the starting of MCA, either when a first message is put into the transmission queue, or each time a message is put into the transmission queue or when the queue contains a specified number of messages.

Assuming that the transmission of the message(s) from the channel sender 22 cannot be established because a failure of the connection between the channel sender and the channel receiver, the mechanism according to the invention avoids the messages to be accumulated in the transmission queue without being transmitted. For this, the program MCA Puts a message in an event queue as soon as it knows the connectivity of the channel to be used. Assuming that MCA detects that this channel has failed, a message "channel stopped" is put into event queue 44 at the same time the transmission of the messages is stopped on the channel.

The event queue is monitored by a trigger monitor 46 which is in charge of usually monitoring the initiation queue in order to invoke the application program specified in the process 48 and to retrieve the messages received in the local queue. When a channel event message is detected by the trigger monitor 46, this one invokes a channel routing task 50, e.g. a daemon, which is waiting for a notification via a GET instruction. This background task then activates a finite-state machine 52 which starts various actions according to the following entries when the primary channel sender is SDR1 and the alternate channel senders are SDR2, SDR3 and SDR4.

| Channel Event | Channel Sender at Source | Channel Type | Action |
| --- | --- | --- | --- |
| Channel started | SDR1, SDR2, SDR3 or SDR4 | Normal | None |
| Channel stopped | SDR1 | Normal | None |
| Channel stopped | SDR1 | Abnormal | Route primary channel (SDR1) to the first available alternate channel |
| Channel stopped | SDR2, SDR3 or SDR4 | Normal | Restore initial route (SDR1) |
| Channel stopped | SDR2, SDR3 or SDR4 | Abnormal | Reroute channel (SDR1) to one of the remaining alternate channels |

According to the above table giving the actions taken by the finite-state machine 52 in function of the entries, the channel sender and the type, there is no action when the event is "channel started" and the type "normal". But an action is to be taken as soon as a channel is stopped and the type is abnormal. If the channel being stopped is the primary channel, but the type is abnormal (the channel has failed), the action to be taken is to route channel sender SDR1 to the first available alternate channel sender such as SDR2, SDR3 or SDR4. Note that, when a channel has failed, it may be due to the failure of the link, of the channel sender, of the channel receiver, or a combination of these ones.

Figure 3:
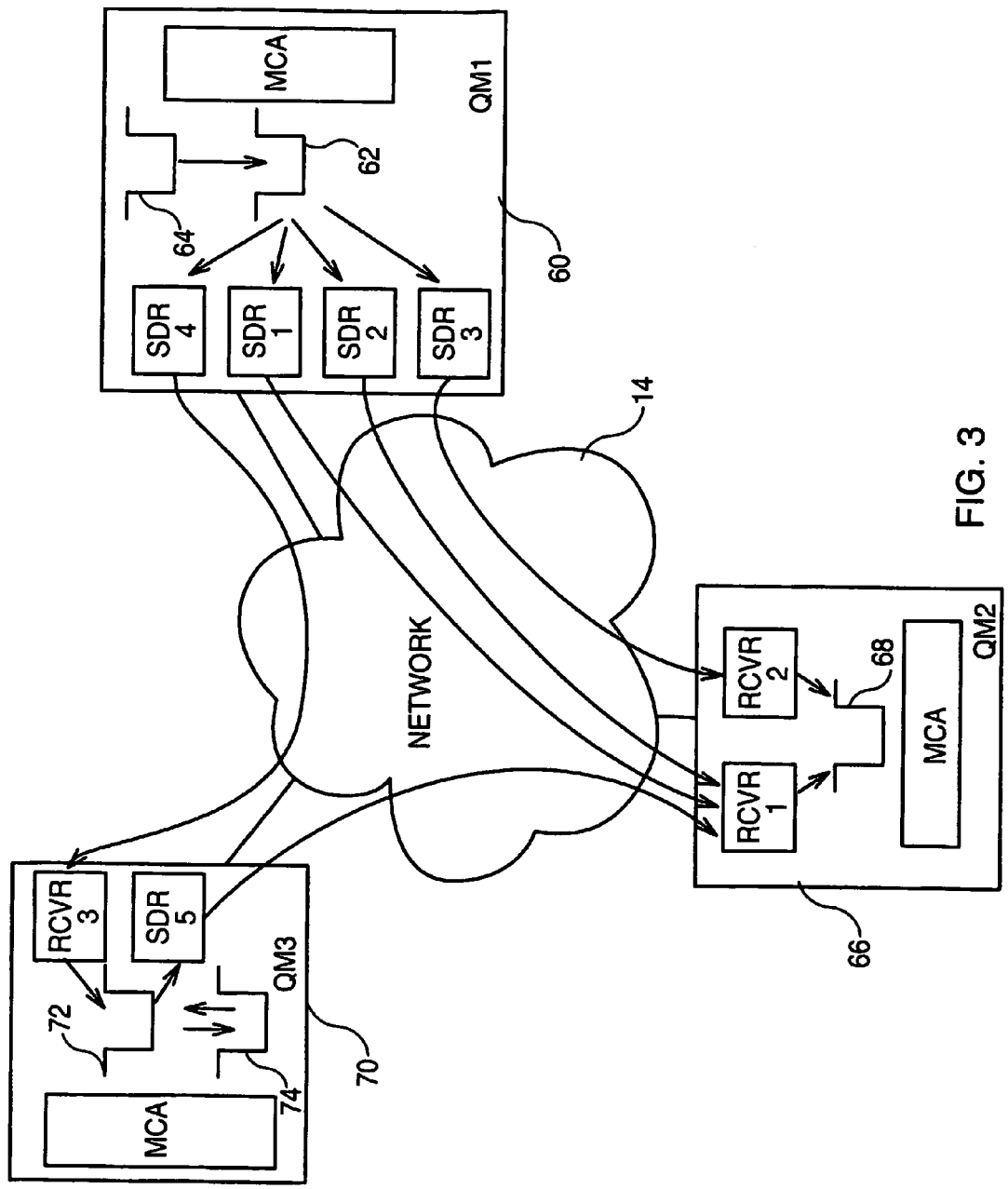
FIG. 3 is a block-diagram representing the flow of the messages sent from the source queue manager to the destination queue manager and wherein an intermediate queue manager is used.

In reference to FIG. 3, it is assumed that a channel has failed and the primary channel sender SDR1 is unavailable. In such a case, in QM1 60, the transmission queue 62 receiving the messages from remote queue 64 does not send any longer the messages by using SDR1. Assuming that, in the destination queue manager QM2 66, the primary channel receiver RCVR1 is always available, the messages are sent on the channel defined by the pair SDR2 and RCVR1 instead of the pair SDR1 and RCVR1. But, the messages being received are always put into the same local or transmission queue 68.

Assuming that, not only the primary channel sender SDR1 is unavailable, but also the primary channel receiver RCVR2 is available, it is possible to use a different pair of channel sender and channel receiver such as the pair SDR3 and RCVR2 to send the messages over network 14. Nevertheless, the messages received in QM2 are put in the same local or transmission queue 68.

In an alternate embodiment illustrated in FIG. 3, the transmission of messages from QM1 to QM2 is performed by using an intermediate queue manager QM3 70. In such a case, the messages queued in the transmission queue 62 of QM1 are sent from the channel sender SDR4 through network 14 to the channel receiver RCVR3 of QM3. The received messages are put into the local or transmission queue 72. Then, they are transferred into the remote queue 74 before being put into the transmission queue 72. It must be noted that the remote queue 74 is not a real queue but a structure which contains the characteristics of the local or transmission queue 68 in QM2. Therefore, the messages which are transferred from remote queue 74 to transmission queue 72 in QM2 are formatted to be forwarded to QM2. As illustrated in FIG. 3, the messages are sent from the channel sender SDR5 through network 14 to the channel receiver RCVR2 of QM2.

Figure 4:
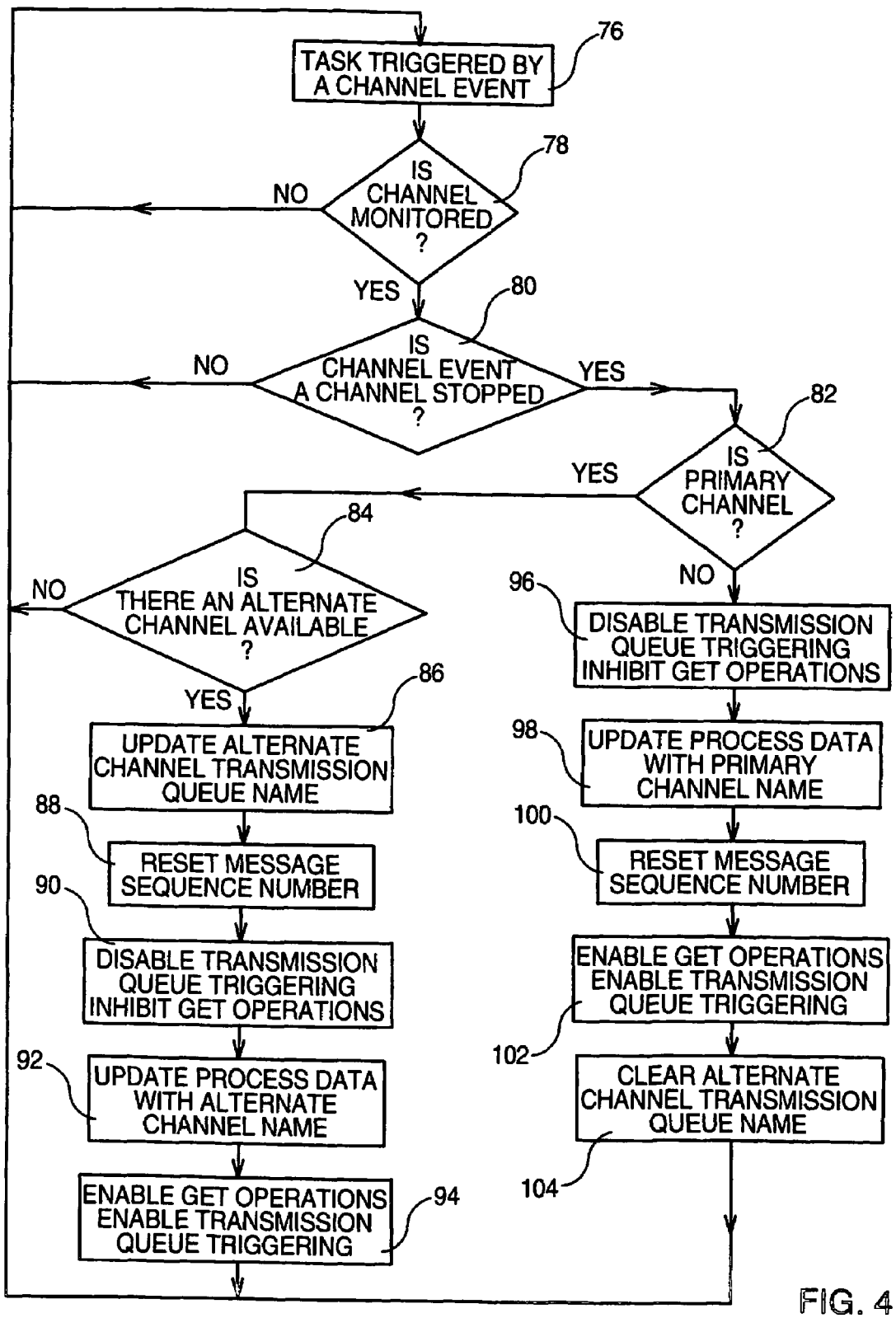
FIG. 4 is a flow chart of the process implemented by the source queue manager each time a channel event is detected.

The flow chart corresponding to the steps carried out by the source queue manager when a channel event has been posted is illustrated in FIG. 4. First, the channel routing task 50 (see FIG. 2) which is a daemon in the preferred embodiment, is triggered by the channel event put in the event queue (step 76). It is determined whether the channel being identified by the event is a channel being monitored by the system (step 78). If not, the process is looped back to the beginning. If it is the case, it is determined whether the channel event is a "channel stopped" (step 80). If not, the process is looped back to the beginning. If it is the case, it is determined whether the channel which is stopped is a primary channel or not (step 82). If so, it is determined whether there is an alternate channel being available to replace the primary channel (step 84). If not, the process is looped back to the beginning.

If there is an alternate channel which may be used, for example SDR2, SDR3 or SDR4, the transmission queue name of the selected alternate channel is updated with the transmission queue name of the primary channel. Then, the message sequence number for the channel is reset with a specified sequence number to be used the next time that the channel is started (step 88). In addition to resetting the value at the end at which the command is issued, the value at the other end will also be reset to the same value, next time this channel is initiated. The next step consists in disabling the transmission queue triggering and inhibiting the GET operations on related transmission queue (step 90). The data of related process is then updated with the alternate channel name e.g., SDR2 (step 92). Finally, the GET operations on the transmission queue are re-enabled and the triggering of the related transmission queue is enabled (step 94), before looping back the process to the beginning.

When it is determined that the channel being stopped is not the primary channel (step 82), this means that the channel being stopped is already an alternate channel. In such a case, the transmission queue triggering is disabled and the GET operation are inhibited (step 96) before updating the data of the related process with the original primary channel name in order to recover the initial configuration (step 98). Then, the message sequence number is reset as in the case when the primary channel has failed (step 100). As previously, the next step consists in enabling the GET operations and enabling the triggering of the transmission queue (step 102). Then, the transmission queue name of the alternate channel is cleared in order to remove the logical communication link used for the alternate routing (step 104) before looping back to the beginning of the process.

The invention claimed is:

1. A method for routing channels in which messages are transmitted across a network from a source application to a destination application, said method comprising:
   activating, by a background task, a finite-state machine, wherein the messages comprise a first message in a transmission queue of the source application for subsequent transmission of the first message from the transmission queue across the network over a first channel of said channels to a local queue of the destination application;
   performing or not performing a channel routing action, by the activated finite-state machine, in dependence on: a channel event having caused the first channel to currently be staffed or stopped, a channel sender currently set for the first channel, and an event type characterizing the channel event as being normal or abnormal, wherein said channel routing action is a function of the channel event, the channel sender, and the event type;
   prior to said activating the finite-state machine: inserting a second message into an event queue such that the second message denotes the channel event, detecting the second message in the event queue, and responsive to said detecting, invoking the background task, wherein said detecting and said invoking are performed by a trigger monitor;
   putting an initiating message into an initiation queue in conjunction with said first message being in the transmission queue;
   monitoring the initiation queue, by the trigger monitor, to detect the initiating message in the initiation queue; and
   responsive to detection of the initiating message in the initiation queue by the trigger monitor, invoking the destination application by the trigger monitor.

2. A method for routing channels in which messages are transmitted across a network from a source application to a destination application, said method comprising:
   activating, by a background task, a finite-state machine, wherein the messages comprise a first message in a transmission queue of the source application for subsequent transmission of the first message from the transmission queue across the network over a first channel of said channels to a local queue of the destination application;
   performing or not performing a channel routing action, by the activated finite-state machine, in dependence on: a channel event having caused the first channel to currently be started or stopped, a channel sender currently set for the first channel, and an event type characterizing the channel event as being normal or abnormal, wherein said channel routing action is a function of the channel event, the channel sender, and the event type;
   prior to said activating the finite-state machine: inserting a second message into an event queue such that the second message denotes the channel event, detecting the second message in the event queue, and responsive to said detecting, invoking the background task, wherein said detecting and said invoking are performed by a trigger monitor;
   putting an initiating message into an initiation queue in conjunction with said first message being in the transmission queue;
   monitoring the initiation queue, by a channel initiator, to detect the initiating message in the initiation queue;
   responsive to detection of the initiating message in the initiation queue by the channel initiator, starting a message channel agent (MCA) by the channel initiator,
   determining, by the MCA, the channel event; and
   performing, by the MCA, said inserting the second message into the event queue.

3. A system for implementing a method for routing channels in which messages are transmitted across a network from a source application to a destination application, wherein the system comprises a finite-state machine, said method comprising:
   activating, by a background task, the finite-state machine, wherein the messages comprise a first message in a transmission queue of the source application for subsequent transmission of the first message from the transmission queue across the network over a first channel of said channels to a local queue of the destination application;
   performing or not performing a channel routing action, by the activated finite-state machine, in dependence on: a channel event having caused the first channel to currently be started or stopped, a channel sender currently set for the first channel, and an event type characterizing the channel event as being normal or abnormal, wherein said channel routing action is a function of the channel event, the channel sender, and the event type;
   prior to said activating the finite-state machine: inserting a second message into an event queue such that the second message denotes the channel event, detecting the second message in the event queue, and responsive to said detecting, invoking the background task, wherein said detecting and said invoking are performed by a trigger monitor;

putting an initiating message into an initiation queue in conjunction with said first message being in the transmission queue;

monitoring the initiation queue, by the trigger monitor, to detect the initiating message in the initiation queue; and responsive to detection of the initiating message in the initiation queue by the trigger monitor, invoking the destination application by the trigger monitor.

4. A system for implementing a method for routing channels in which messages are transmitted across a network from a source application to a destination application, wherein the system comprises a finite-state machine, said method comprising:

activating, by a background task, the finite-state machine, wherein the messages comprise a first message in a transmission queue of the source application for subsequent transmission of the first message from the transmission queue across the network over a first channel of said channels to a local queue of the destination application;

performing or not performing a channel routing action, by the activated finite-state machine, in dependence on: a channel event having caused the first channel to currently be started or stopped, a channel sender currently set for the first channel, and an event type characterizing the channel event as being normal or abnormal, wherein said channel routing action is a function of the channel event, the channel sender, and the event type;

prior to said activating the finite-state machine: inserting a second message into an event queue such that the second message denotes the channel event, detecting the second message in the event queue, and responsive to said detecting, invoking the background task, wherein said detecting and said invoking are performed by a trigger monitor;

putting an initiating message into an initiation queue in conjunction with said first message being in the transmission queue;

monitoring the initiation queue, by a channel initiator, to detect the initiating message in the initiation queue;

responsive to detection of the initiating message in the initiation queue by the channel initiator, starting a message channel agent (MCA) by the channel initiator, determining, by the MCA, the channel event; and performing, by the MCA, said inserting the second message into the event queue.

* * * * *

UNITED STATES PATENT AND TRADEMARK OFFICE
CERTIFICATE OF CORRECTION

PATENT NO. : 7,590,138 B2  
APPLICATION NO. : 10/557917  
DATED : September 15, 2009  
INVENTOR(S) : Benard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 796 days.

Signed and Sealed this

Twenty-first Day of September, 2010

David J. Kappos  
*Director of the United States Patent and Trademark Office*